March 18, 1941. U. L. SMITH 2,235,390

MULTIPLE MOVING COIL INSTRUMENT

Filed Oct. 26, 1939

WITNESSES:

INVENTOR
Uel L. Smith.
BY
ATTORNEY

Patented Mar. 18, 1941

2,235,390

UNITED STATES PATENT OFFICE 2,235,390

MULTIPLE MOVING COIL INSTRUMENT

Uel L. Smith, Morris Plains, N. J., assignor to Westinghouse Electric & Manufacturing Company, East Pittsburgh, Pa., a corporation of Pennsylvania Application October 26, 1939, Serial No. 301,398

5 Claims. (Cl. 171—95)

My invention relates to electrical measuring instruments and particularly to permanent magnet type instruments employing moving coils in the magnetic field thereof.

An object of my invention is to provide an instrument of this type which will simultaneously indicate the value of a plurality of different electrical quantities.

Another object of my invention is to provide an instrument of this type which will simultaneously indicate the magnitude of electrical quantities at a plurality of different ranges or ratios.

Heretofore, it has been usual, in testing a battery, for example, to employ both a voltmeter and an ammeter. Where it has been necessary to measure the value of a current or voltage at different ranges or ratios, shunts and multipliers external to the movement of the instrument have been required. These prior art methods not only are expensive, because two or more complete instruments are required but have the further disadvantage that additional time is consumed in making the necessary connections and placing the shunts or multipliers in circuit.

In practicing my invention, I provide a permanent magnet moving coil, or d'Arsonval type instrument with a plurality of movable coils each of which gives an indication of a different electrical quantity, or of the same quantity over different ranges or at different ratios. These moving coils which are supplied with different effective numbers of turns are acted upon by the same permanent magnet field and may be installed in the same casing.

Figure 1:
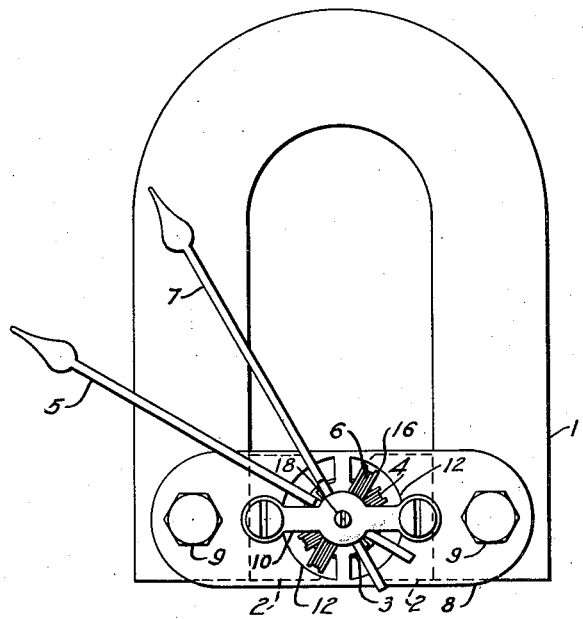
Figure 2:
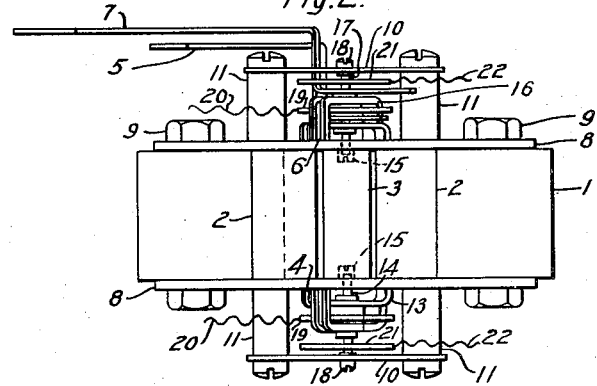

Figure 1 of the accompanying drawing is a view in front elevation of a portion of a permanent magnet moving coil instrument constructed in accordance with my invention, and Fig. 2 is a bottom plan view of the instrument as shown in Fig. 1.

The device comprises, in general, a permanent field magnet 1, pole pieces 2 therefor, a stationary cylindrical core member 3 disposed between the pole pieces 2, a movable element or coil 4 surrounding the core member 3 and pivoted thereto, a pointer 5 carried by the coil 4, a second movable element or coil 6 surrounding the core member 3 outside of the coil 4, a pointer 7 carried by the coil 6, bridge members 8 secured to the magnet 1 by bolts 9 for supporting the stationary core 3, bridge members 10 for pivotally supporting the coil 6, the standards 11 for supporting the bridge members 10.

The permanent magnet 1 is of the usual horseshoe shape and of rectangular cross sectional area having flat inner end surfaces against which flat end surfaces of the pole pieces 2 rest. The pole pieces 2, which are suitably secured in position against the ends of the magnet 1, are provided with inner or pole surfaces of cylindrical curvature and of sufficiently greater radius than the cylindrical core 3 to provide an arcuate air gap in which the coils 4 and 6 are adapted to turn.

The core 3 is supported in its position midway between the pole pieces 2 in any suitable manner as by the bridge members 8 at points adjacent its ends. These bridge members are provided with arcuate slots 12, registering with the spaces between pole pieces 2 and the core 3 through which portions of the coils 4 and 6 extend.

The coil 4 is wound on a bobbin or frame 13 which carries inwardly pointed pivot pins 14 to be supported in bearings or jewel elements 15 carried in the ends of the core 3.

The second coil 6 is wound on a bobbin or frame 16 and arranged to swing outside the coil 4. Frame 16 carries pivot pins 17 supported in adjustable bearings or jewel members 18 carried by the bridge members 10.

The coil 4 is connected to the instrument terminals through the usual biasing springs 19 and leads 20 at each end thereof while the coil 6 is likewise connected to terminals through similar springs 21 and leads 22. These spring and lead assemblies may be insulated from each other in any suitable manner. Although omitted from the drawing for the sake of simplicity, balance arms of the usual construction may be attached to the pointers 5 and 7.

The coils 4 and 6 may be provided with a different number of turns and a dial with two differently calibrated scales may be employed. Thus, for example, one coil may be wound so that its pointer indicates volts on one scale while the other coil is designed so that its pointer indicates the circuit current on the other scale. It will be obvious that the instrument terminals may be interconnected in any manner desired, as in series or in parallel, and in some cases additional convenience may result from interconnecting the coils inside the instrument casing and thus providing only two or three terminals instead of four.

An instrument made in accordance with my invention will be found both economical and accurate. The extent of the interference of the coils 4 and 6 with each other is so small that it cannot be noticed on the instrument scales. This is so because the flux density from the permanent magnet 1 is one thousand or more times that from the two coils. Thus the coils will pass each other without noticeable interference.

While I have shown and described a particular form of instrument in which only two moving coils are employed, it will be obvious that the number of coils is not limited to two and that other changes may also be effected in my invention without departing from the spirit and scope thereof, as set forth in the appended claims.

I claim as my invention:

1. In an electrical measuring instrument, a field magnet structure including spaced cooperating pole portions defining an air gap, a plurality of movable coil members disposed in said air gap, and indicating means independently controlled by each of said coil members.

2. An electrical measuring instrument comprising a permanent field magnet structure including spaced cooperating pole portions defining a substantially cylindrical space therebetween, a magnetic core annularly spaced from said pole portions, a plurality of independently movable coils lying in such annular space, and indicating means independently controlled by each of said coils.

3. An electrical measuring instrument comprising a field magnet structure including spaced pole pieces, a cylindrical magnetic core mounted between said pole pieces, said pole pieces being cut away to provide an annular space between the pole pieces and said core, a plurality of current conducting coils mounted in said annular space and rotatable about an axis substantially coincident with the axis of said cylindrical core, and indicating means independently controlled by each of said coils.

4. An electrical measuring instrument comprising a field magnet structure including spaced pole pieces, a cylindrical magnetic core mounted between said pole pieces, said pole pieces being cut away to provide an annular space between the pole pieces and said core, a current conducting coil and means for mounting it in said annular space for rotation about substantially the axis of said cylindrical core, a second current conducting coil in said annular space, said second coil being of smaller external dimensions than said first coil, means for mounting said second coil within said first coil and in a position for rotation about substantially the same axis as said first coil, and indicating means independently controlled by each of said coils.

5. An electrical measuring instrument comprising a field magnet structure including spaced pole pieces, a magnetic core mounted between said pole pieces to form an annular air gap therebetween, a pair of movable current conducting coils, means for mounting said coils in said air gap independently pivotal about substantially the same axis with one of said coils disposed for movement within the other, and an indicating pointer controlled by each of said coils, said pointers being in superimposed relationship and pivotal about substantially the same axis.

UEL L. SMITH.